US012561356B2

(12) United States Patent
Kataoka et al.

(10) Patent No.: US 12,561,356 B2
(45) Date of Patent: Feb. 24, 2026

(54) NON-TRANSITORY COMPUTER-READABLE RECORDING MEDIUM STORING INFORMATION PROCESSING PROGRAM, INFORMATION PROCESSING METHOD, AND INFORMATION PROCESSING APPARATUS

(71) Applicant: FUJITSU LIMITED, Kawasaki (JP)

(72) Inventors: Masahiro Kataoka, Kamakura (JP); Ryo Matsumura, Numazu (JP); Ryohei Nagaura, Kobe (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 18/516,104

(22) Filed: Nov. 21, 2023

(65) Prior Publication Data

US 2024/0086438 A1     Mar. 14, 2024

Related U.S. Application Data

(63) Continuation of application No. PCT/JP2021/022534, filed on Jun. 14, 2021.

(51) Int. Cl.
*G06F 16/33* (2025.01)
*G06F 16/334* (2025.01)
*G06F 40/289* (2020.01)

(52) U.S. Cl.
CPC ........ *G06F 16/3347* (2019.01); *G06F 40/289* (2020.01)

(58) Field of Classification Search
None
See application file for complete search history.

(56) References Cited

U.S. PATENT DOCUMENTS

2011/0137921 A1* 6/2011 Inagaki ............... G06F 16/3347
707/E17.061
2012/0330977 A1 12/2012 Inagaki
(Continued)

FOREIGN PATENT DOCUMENTS

JP       2011-118689        6/2011
JP       2012-230566        11/2012
(Continued)

OTHER PUBLICATIONS

International Search Report with English-language translation and Written Opinion mailed Sep. 7, 2021, in connection with PCT/JP2021/022534.
(Continued)

*Primary Examiner* — Kavita Stanley
*Assistant Examiner* — Cao D Vuong
(74) *Attorney, Agent, or Firm* — Fujitsu Intellectual Property Center

(57) ABSTRACT

A medium storing a program including: classifying vectors of first sentences in a file into each similar vector; generating an inverted index associating a vector of each first sentence with a position of the first sentence on the file; identifying a feature sentence from a second sentences included in a second sentences; specifying similar vectors being vectors similar to a vector of the feature sentence based on the inverted index; specifying, for each similar vector, first transition data indicating transition of vectors at positions before and after the similar vector based on the inverted index; and specifying, from pieces of first transition data obtained by performing the specifying of the first transition data on the similar vectors, transition data similar to second transition data indicating transition of vectors of sentences before and after the feature sentence, to output the transition data as a response of the search query.

15 Claims, 16 Drawing Sheets

(56) References Cited

U.S. PATENT DOCUMENTS

| | | | | |
|---|---|---|---|---|
| 2018/0052929 A1* | 2/2018 | Liu | ..................... | G06F 16/3347 |
| 2019/0179901 A1* | 6/2019 | Kataoka | .............. | G06F 16/3347 |
| 2019/0294624 A1 | 9/2019 | Miyabe et al. | | |
| 2020/0117710 A1 | 4/2020 | Okura et al. | | |
| 2020/0125575 A1* | 4/2020 | Ghoshal | ................ | G06F 3/0484 |
| 2022/0035848 A1 | 2/2022 | Kataoka et al. | | |

FOREIGN PATENT DOCUMENTS

| | | |
|---|---|---|
| JP | 2018-097562 | 6/2018 |
| JP | 2019-101993 | 6/2019 |
| JP | 2020-060970 | 4/2020 |
| WO | 2020/213158 | 10/2020 |

OTHER PUBLICATIONS

EESR—Extended European Search Report mailed on Jul. 15, 2024 for corresponding European Patent Application No. 21945896.5 [10 pages].

Omar Khattab et al., "ColBERT: Efficient and Effective Passage Search via Contextualized Late Interaction over BERT", Apr. 4, 2020 (Apr. 4, 2020), XP093278369, Retrieved from the Internet: URL:https://arxiv.org/pdf/2004.12832.

EPOA—Office Action of European Patent Application No. 21945896.5 dated May 23, 2025 [8 pages]. U.S. References cited in the EPOA were previously submitted in the IDS filed on Jul. 19, 2024 and Nov. 21, 2023.

* cited by examiner

FIG. 1

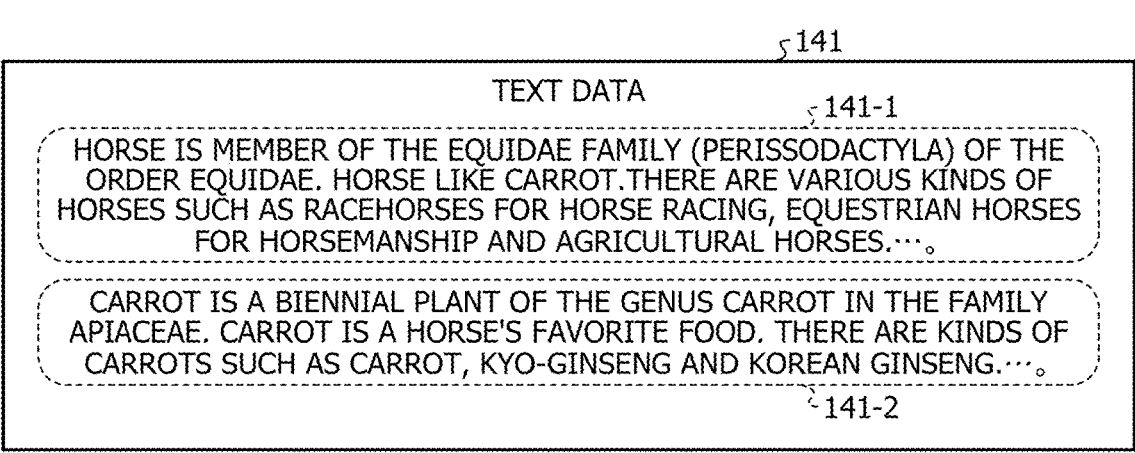

```
                                    ┌─ 141
┌──────────────────────────────────────────────────────────────┐
│                        TEXT DATA          ┌─ 141-1             │
│  ┌──────────────────────────────────────────────────────────┐ │
│  ┆ HORSE IS MEMBER OF THE EQUIDAE FAMILY (PERISSODACTYLA) OF ┆ │
│  ┆ THE ORDER EQUIDAE. HORSE LIKE CARROT.THERE ARE VARIOUS    ┆ │
│  ┆ KINDS OF HORSES SUCH AS RACEHORSES FOR HORSE RACING,      ┆ │
│  ┆ EQUESTRIAN HORSES FOR HORSEMANSHIP AND AGRICULTURAL       ┆ │
│  ┆ HORSES.···。                                               ┆ │
│  └──────────────────────────────────────────────────────────┘ │
│  ┌──────────────────────────────────────────────────────────┐ │
│  ┆ CARROT IS A BIENNIAL PLANT OF THE GENUS CARROT IN THE     ┆ │
│  ┆ FAMILY APIACEAE. CARROT IS A HORSE'S FAVORITE FOOD. THERE ┆ │
│  ┆ ARE KINDS OF CARROTS SUCH AS CARROT, KYO-GINSENG AND      ┆ │
│  ┆ KOREAN GINSENG.···。                                       ┆ │
│  └──────────────────────────────────────────────────────────┘ │
│                                            └─ 141-2            │
└──────────────────────────────────────────────────────────────┘
```

CALCULATE SENTENCE VECTOR

SE1-1
HORSE IS MEMBER OF THE EQUIDAE FAMILY (PERISSODACTYLA) OF THE ORDER EQUIDAE. ⇨ (SV1-1)

SE2-1
CARROT IS A BIENNIAL PLANT OF THE GENUS CARROT IN THE FAMILY APIACEAE. ⇨ (SV2-1)

SE1-2
HORSE LIKE CARROT. ⇨ (SV1-2)

SE2-2
CARROT IS A HORSE'S FAVORITE FOOD. ⇨ (SV2-2)

SE1-3
THERE ARE VARIOUS KINDS OF HORSES SUCH AS RACEHORSES FOR HORSE RACING, EQUESTRIAN HORSES FOR HORSEMANSHIP AND AGRICULTURAL HORSES. ⇨ (SV1-3)

SE2-3
THERE ARE KINDS OF CARROTS SUCH AS CARROT, KYO-GINSENG AND KOREAN GINSENG ⇨ (SV2-3)

SE1-n
... ⇨ (SV1-n)

SE2-n
... ⇨ (SV2-n)

CLUSTERING

| WORD | STATIC CODE | VECTOR |
|------|-------------|--------|
| HORSE | C01 | va1 |
| CARROT | C02 | va2 |
| LIKE | C03 | va3 |
| FAVORITE FOOD | C04 | va4 |
| HORSE RACING | C05 | va5 |
| … | … | … |

FIG. 6

$\varsigma 143$

| TYPE | X-AXIS (HORIZONTAL) | Y-AXIS (VERTICAL) |
|---|---|---|
| INVERTED INDEX Two | POSITION | WORD VECTOR |
| INVERTED INDEX Tse | POSITION | SENTENCE VECTOR |
| INVERTED INDEX Tpa | POSITION | PARAGRAPH VECTOR |
| INVERTED INDEX Tse-1 | SENTENCE VECTOR | POSITION |
| INVERTED INDEX Tpa-1 | PARAGRAPH VECTOR | POSITION |

FIG. 10

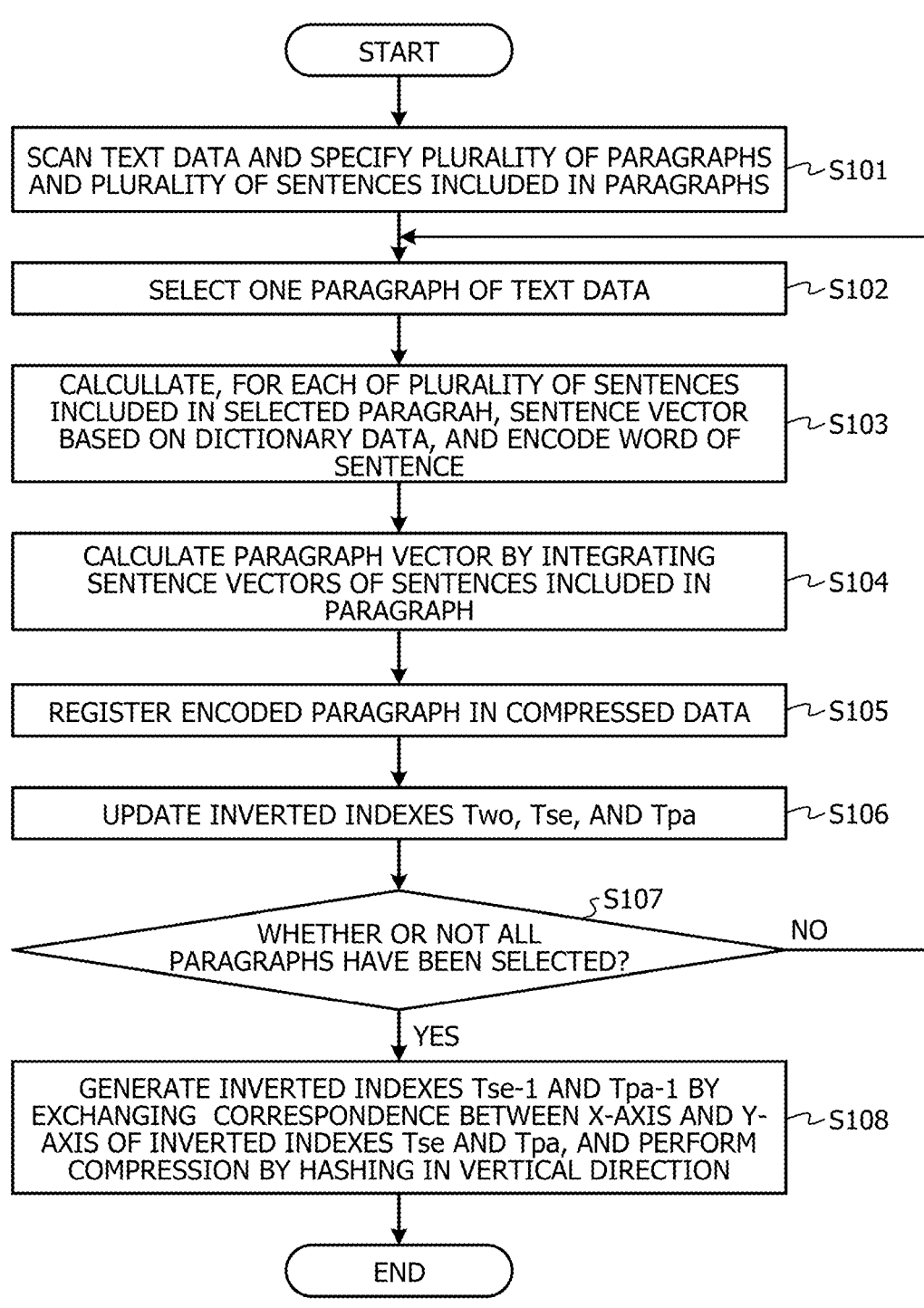

START

SCAN TEXT DATA AND SPECIFY PLURALITY OF PARAGRAPHS AND PLURALITY OF SENTENCES INCLUDED IN PARAGRAPHS — S101

SELECT ONE PARAGRAPH OF TEXT DATA — S102

CALCULLATE, FOR EACH OF PLURALITY OF SENTENCES INCLUDED IN SELECTED PARAGRAH, SENTENCE VECTOR BASED ON DICTIONARY DATA, AND ENCODE WORD OF SENTENCE — S103

CALCULATE PARAGRAPH VECTOR BY INTEGRATING SENTENCE VECTORS OF SENTENCES INCLUDED IN PARAGRAPH — S104

REGISTER ENCODED PARAGRAPH IN COMPRESSED DATA — S105

UPDATE INVERTED INDEXES Two, Tse, AND Tpa — S106

WHETHER OR NOT ALL PARAGRAPHS HAVE BEEN SELECTED? — S107    NO

YES

GENERATE INVERTED INDEXES Tse-1 AND Tpa-1 BY EXCHANGING  CORRESPONDENCE BETWEEN X-AXIS AND Y-AXIS OF INVERTED INDEXES Tse AND Tpa, AND PERFORM COMPRESSION BY HASHING IN VERTICAL DIRECTION — S108

END

FIG. 11

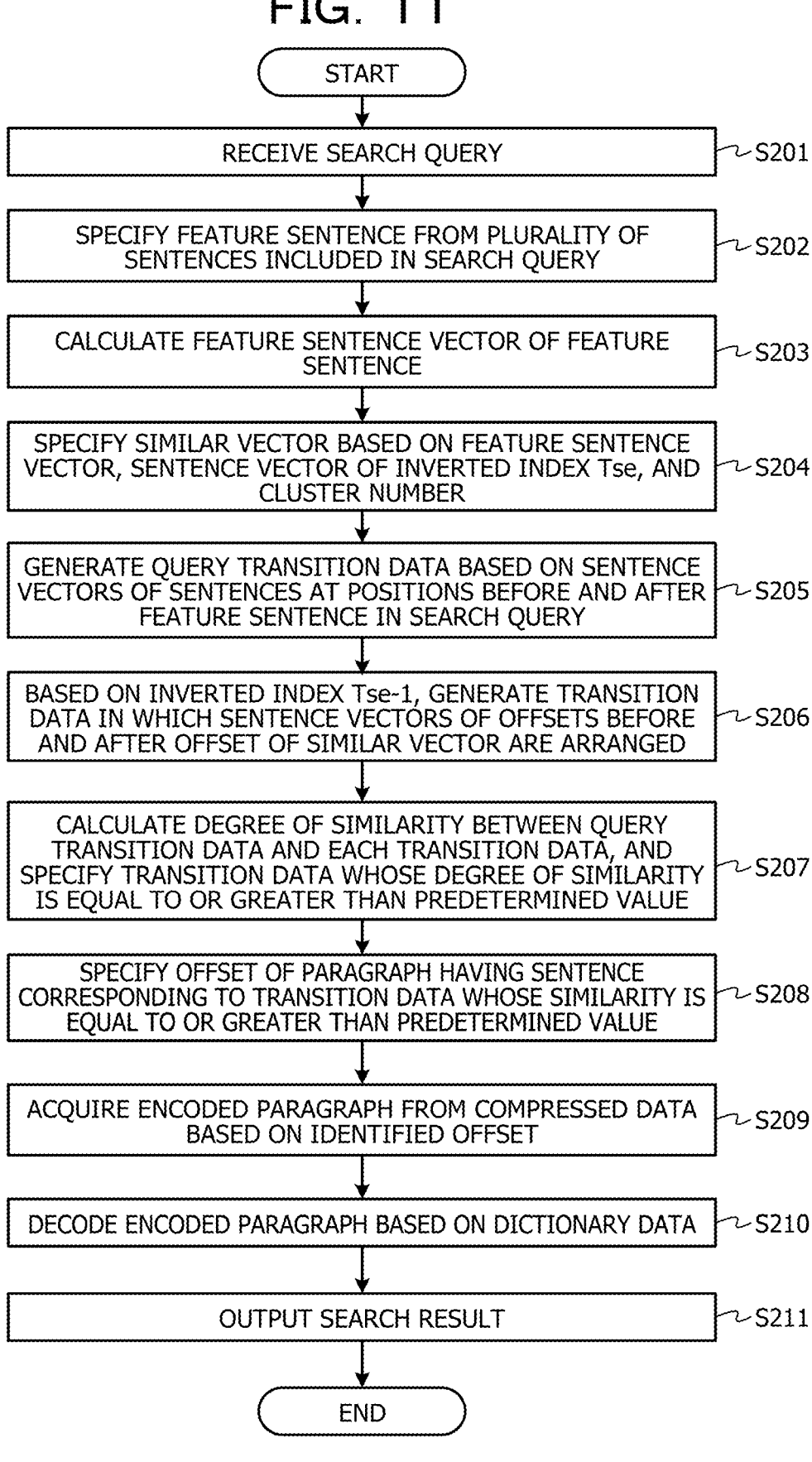

START

RECEIVE SEARCH QUERY — S201

SPECIFY FEATURE SENTENCE FROM PLURALITY OF SENTENCES INCLUDED IN SEARCH QUERY — S202

CALCULATE FEATURE SENTENCE VECTOR OF FEATURE SENTENCE — S203

SPECIFY SIMILAR VECTOR BASED ON FEATURE SENTENCE VECTOR, SENTENCE VECTOR OF INVERTED INDEX Tse, AND CLUSTER NUMBER — S204

GENERATE QUERY TRANSITION DATA BASED ON SENTENCE VECTORS OF SENTENCES AT POSITIONS BEFORE AND AFTER FEATURE SENTENCE IN SEARCH QUERY — S205

BASED ON INVERTED INDEX Tse-1, GENERATE TRANSITION DATA IN WHICH SENTENCE VECTORS OF OFFSETS BEFORE AND AFTER OFFSET OF SIMILAR VECTOR ARE ARRANGED — S206

CALCULATE DEGREE OF SIMILARITY BETWEEN QUERY TRANSITION DATA AND EACH TRANSITION DATA, AND SPECIFY TRANSITION DATA WHOSE DEGREE OF SIMILARITY IS EQUAL TO OR GREATER THAN PREDETERMINED VALUE — S207

SPECIFY OFFSET OF PARAGRAPH HAVING SENTENCE CORRESPONDING TO TRANSITION DATA WHOSE SIMILARITY IS EQUAL TO OR GREATER THAN PREDETERMINED VALUE — S208

ACQUIRE ENCODED PARAGRAPH FROM COMPRESSED DATA BASED ON IDENTIFIED OFFSET — S209

DECODE ENCODED PARAGRAPH BASED ON DICTIONARY DATA — S210

OUTPUT SEARCH RESULT — S211

END

SENTENCE VECTOR

SV1-β SV1-α SV2-2 SV1-2 SV2-β SV2-α

Tse-1

OF1-1
OF1
OF1+1

OF2-1
OF2
OF2+1

OFFSET

| VECTOR | | b2 |
|---|---|---|
| 0 | 0 | |
| 1 | 0 | |
| 2 | 1 | |
| 3 | 0 | |
| 4 | 0 | |
| 5 | 0 | |
| 6 | 0 | |
| 7 | 0 | |
| 8 | 0 | |
| 9 | 0 | |
| 10 | 0 | |
| 11 | 0 | |
| 12 | 0 | |
| 13 | 0 | |
| 14 | 0 | |
| 15 | 1 | |
| 16 | 0 | |
| 17 | 0 | |
| 18 | 0 | |
| 19 | 0 | |
| 20 | 0 | |
| 21 | 0 | |
| 22 | 0 | |
| 23 | 1 | |
| 24 | 0 | |
| 25 | 0 | |
| 26 | 0 | |
| 27 | 0 | |
| 28 | 0 | |
| 29 | 0 | |
| 30 | 0 | |
| 31 | 0 | OFFSET |

BASE:11

| VECTOR | | h21 |
|---|---|---|
| 0 | 0 | |
| 1 | ① | |
| 2 | 1 | |
| 3 | 0 | |
| 4 | ① | |
| 5 | 0 | |
| 6 | 0 | |
| 7 | 0 | |
| 8 | 0 | |
| 9 | 0 | |
| 10 | 0 | OFFSET |

BASE:13

| VECTOR | | h22 |
|---|---|---|
| 0 | 0 | |
| 1 | 0 | |
| 2 | ① | |
| 3 | 0 | |
| 4 | 0 | |
| 5 | 0 | |
| 6 | 0 | |
| 7 | 0 | |
| 8 | 0 | |
| 9 | 0 | |
| 10 | ① | |
| 11 | 0 | |
| 12 | 0 | OFFSET |

FIG. 13A

NON-TRANSITORY COMPUTER-READABLE RECORDING MEDIUM STORING INFORMATION PROCESSING PROGRAM, INFORMATION PROCESSING METHOD, AND INFORMATION PROCESSING APPARATUS

CROSS-REFERENCE TO RELATED APPLICATION

This application is a continuation application of International Application PCT/JP2021/022534 filed on Jun. 14, 2021 and designated the U.S., the entire contents of which are incorporated herein by reference.

FIELD

The present disclosure relates to a non-transitory computer-readable recording medium storing an information processing program and the like.

BACKGROUND

A large amount of text data is registered in a database (DB), and it is required to appropriately search for data similar to user input data from the DB.

An example of a conventional server that performs data search will be described. In a case where the server executes the data search, the search is performed at a granularity such as a word, a sentence, a paragraph to a document. Here, as an example, a server that searches for a paragraph similar to a search query will be described. For example, a search query is specified at a granularity of paragraphs, where each paragraph may include a plurality of sentences.

In the case of the retrieval of the granularity of the paragraph, the server calculates the vector of the paragraph included in the DB by using a static dictionary or the like in which the vector of the word is defined, and generates an inverted index indicating the relationship between the vector of the paragraph and the position of the paragraph on the DB. For example, the server calculates the vector of the paragraph by integrating vectors of a plurality of sentences included in the paragraph. The vector of the sentence is calculated by integrating vectors of a plurality of words included in the sentence.

When the server receives a search query with the paragraph granularity, the server calculates the vector of the paragraph of the search query in the same manner as the case of calculating the vector of the paragraph on the DB, and compares the vector of the paragraph of the search query with the inverted index to specify the position of the paragraph similar to the search query. The server returns information of the specified paragraph as a search result.

Examples of the related art include: [Patent Document 1] Japanese Laid-open Patent Publication No. 2011-118689; and [Patent Document 2] International Publication Pamphlet No. WO2020/213158.

SUMMARY

According to one aspect of the present disclosure, there is provided a storage medium storing a program for causing a computer to perform processing including: classifying vectors of a plurality of first sentences stored in a file into each similar vector; generating an inverted index in which a vector of each first sentence of the plurality of first sentences and a position of the first sentence on the file are associated with each other; identifying, when a search query including a plurality of second sentences is received, a feature sentence from the plurality of second sentences included in the search query; specifying a plurality of similar vectors being vectors similar to a vector of the feature sentence based on the vector of the feature sentence, each vector included in the inverted index, and a result of the classifying; specifying, for each similar vector of the plurality of similar vectors, first transition data indicating transition of vectors at positions before and after the similar vector based on the similar vector and the inverted index; and specifying, from among a plurality of pieces of first transition data obtained by performing the specifying of the first transition data on the plurality of similar vectors, transition data similar to second transition data, to output the transition data as a response of the search query, the second transition data being data indicating transition of vectors of sentences before and after the feature sentence in the search query.

BRIEF DESCRIPTION OF DRAWINGS

FIG. 1 is a diagram (1) for explaining processing of an information processing apparatus according to the present embodiment;

FIG. 5 is a diagram illustrating an example of a data structure of dictionary data;

FIG. 6 is a diagram illustrating an example of a data structure of an inverted index table;

FIG. 10 is a flowchart (1) illustrating a processing procedure of the information processing apparatus according to the present embodiment;

FIG. 11 is a flowchart (2) illustrating the processing procedure of the information processing apparatus according to the present embodiment;

FIG. 13A is a diagram for explaining an example of processing for restoring the first index;

DESCRIPTION OF EMBODIMENTS

However, in the related art described above, there is a problem in that data search similar to a search query is not highly accurate.

For example, when similar paragraph candidates are narrowed down based on a paragraph vector of a search query with respect to each of a plurality of paragraph vectors set in an inverted index of the paragraph granularity, each paragraph of the candidates is composed of a plurality of sentences, and the respective sentences may be different from each other in each sentence vector and its transition, so that the accuracy of the search decreases.

According to one aspect of the present disclosure, there is provided an information processing program, an information processing method, and an information processing apparatus capable of performing a search for data similar to a search query with high accuracy and efficiency.

Hereinafter, embodiments of an information processing program, a method, and a device disclosed in the present application will be described with reference to the drawings. However, the present invention is not limited to these embodiments.

EXAMPLES

Figure 2:
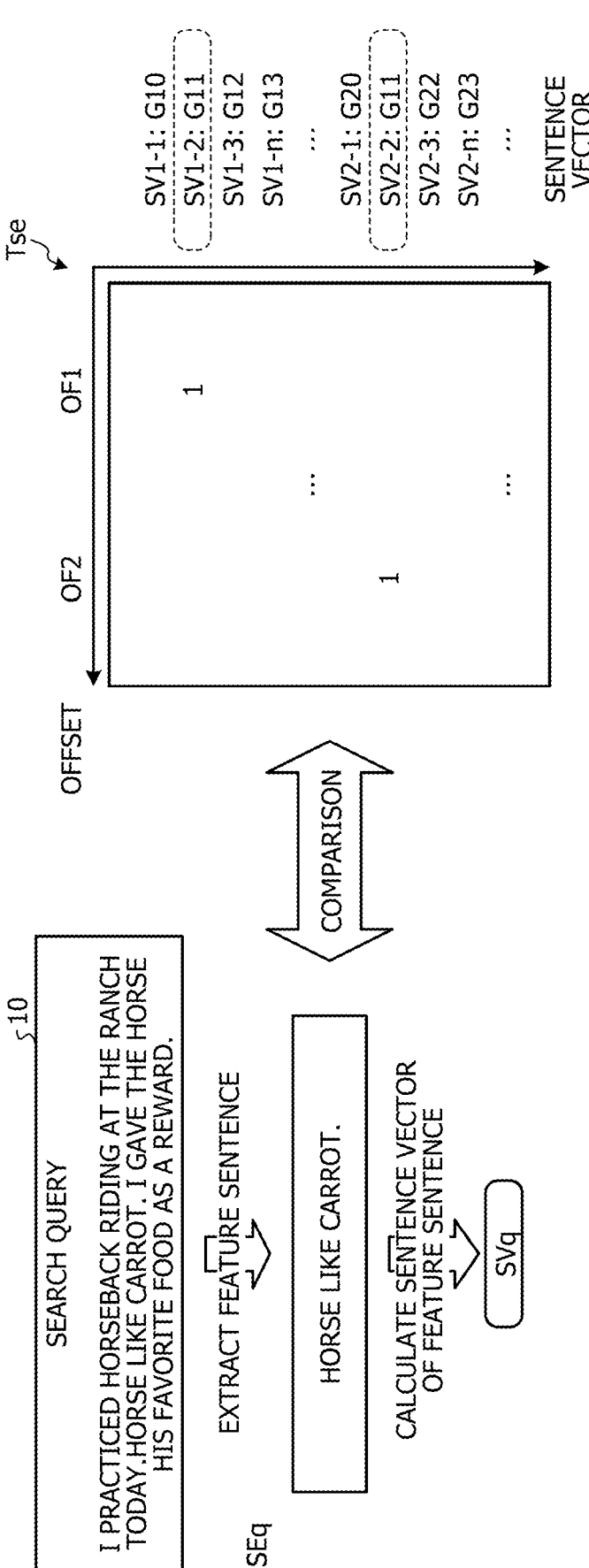
FIG. 2 is a diagram (2) for explaining processing of the information processing apparatus according to the present embodiment.
Figure 3:
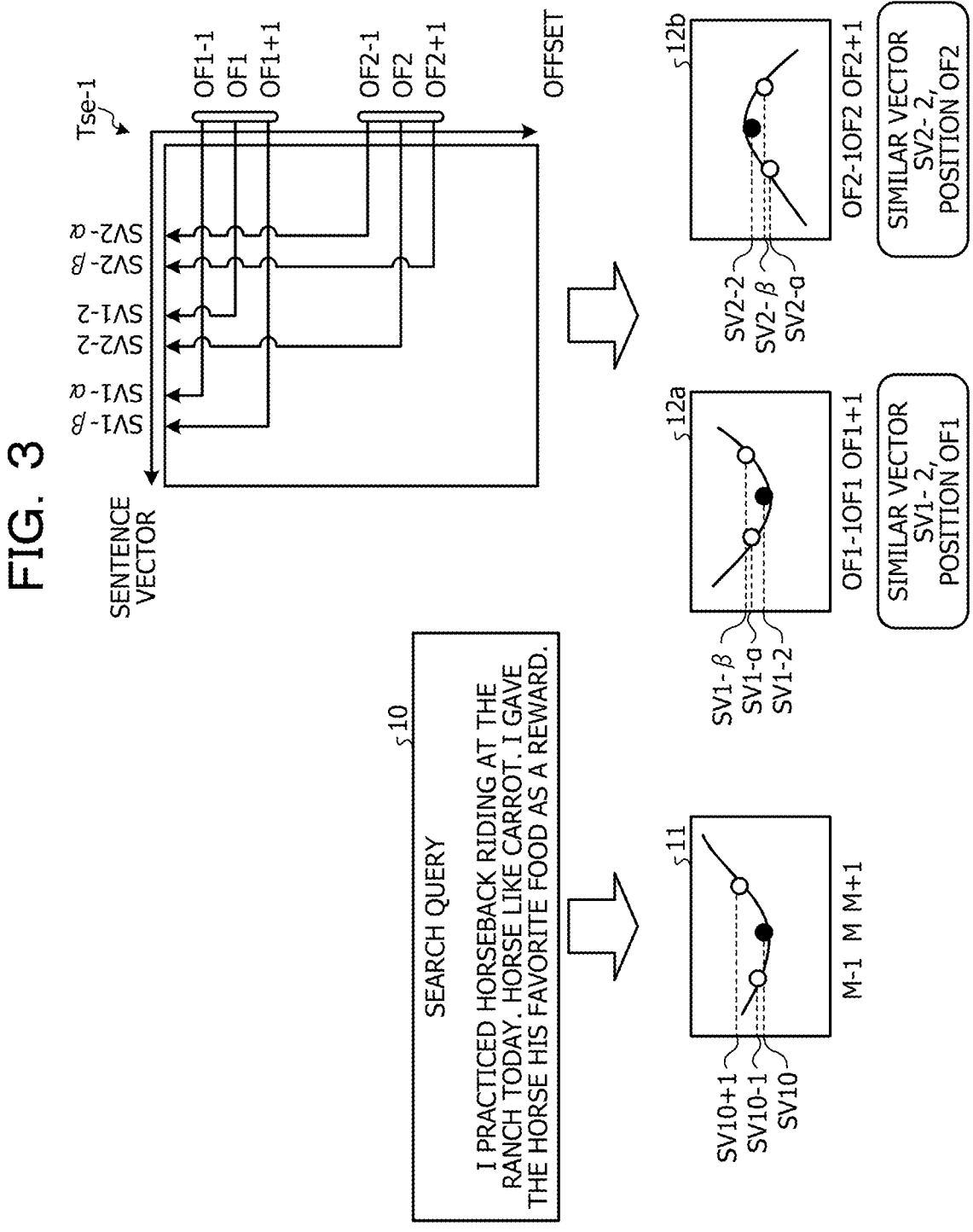
FIG. 3 is a diagram (3) for explaining the processing of the information processing apparatus according to the present embodiment.

A process of the information processing apparatus according to the present embodiment will be described. FIGS. 1, 2, and 3 are diagrams for explaining processing of the information processing apparatus according to the present embodiment. FIG. 1 will be described. The information processing apparatus performs preprocessing using the text data 141. The text data 141 includes a plurality of paragraphs 141-1 and 141-2. FIG. 1 illustrates the paragraphs 141-1 and 141-2; the other paragraphs are omitted.

The paragraph 141-1 includes a plurality of sentences SE1-1, SE1-2, SE1-3, and SE1-$n$. The paragraph 141-2 includes a plurality of sentences SE2-1, SE2-2, SE2-3, and SE2-$n$. A sentence includes a plurality of words.

The information processing apparatus calculates vectors of the sentences SE1-1 to SE1-$n$ and vectors of the sentences SE2-1 to SE2-$n$. For example, the information processing apparatus calculates a vector of a sentence by integrating vectors of words included in the sentence. As will be described later, the vector of each word is set in the dictionary data. In the following description, a vector of a sentence is referred to as a "sentence vector". The vector shown in the present embodiment corresponds to the dispersion vector.

The sentence vectors of the sentences SE1-1, SE1-2, SE1-3, and SE1-$n$ are denoted as SV1-1, SV1-2, SV1-3, and SV1-$n$, respectively. The sentence vectors of the sentences SE2-1, SE2-2, SE2-3, and SE2-$n$ are denoted as SV2-1, SV2-2, SV2-3, and SV2-$n$, respectively.

The information processing apparatus calculates sentence vectors in the same way, for other sentences that are not illustrated.

The information processing apparatus classifies a plurality of similar sentence vectors into the same cluster by performing clustering based on the sentence vectors of the respective sentences. In the example illustrated in FIG. 1, the sentence vectors SV1-2 and SV2-2 are classified into the same cluster. The information processing apparatus associates each sentence vector with an identifier (ID) for uniquely identifying a cluster to which the sentence vector belongs.

FIG. 2 will be described. The information processing apparatus generates an inverted index Tse based on the result as depicted in FIG. 1. The inverted index Tse is information that defines the relationship between the sentence vector and the offset of the word at the beginning of the sentence. In the inverted index Tse, offsets are set on the x-axis (horizontal axis), and sentence vectors are set on the y-axis (vertical axis). The offset indicates position information of the sentence corresponding to the sentence vector.

For example, when the flag "1" is set in the region of the inverted index Tse where the row of the sentence vector "SV1-2" and the column of the offset "OF1" intersect, this indicates that the position of the sentence of the sentence vector "SV1-2" is the offset "OF1".

A sentence vector set on the y-axis of the inverted index Tse is assigned with a "cluster number" for uniquely identifying a cluster classified by the clustering described with reference to FIG. 1. For example, in the inverted index Tse, the sentence vector "SV1-1" is assigned the cluster number "G10". Sentence vectors having the same cluster number are classified into the same cluster. For instance, both the sentence vector SV1-2 and the sentence vector SV2-2 are classified into the same cluster since the same cluster number "G11" is assigned to the sentence vectors SV1-2 and SV2-2.

Next, processing performed when the information processing apparatus receives the search query 10 will be described. The search query 10 includes a plurality of sentences. The information processing apparatus specifies a feature sentence from a plurality of sentences included in the search query 10. For example, the information processing apparatus specifies, as the feature sentence, a sentence including many words with a low appearance frequency. In the example of FIG. 2, for convenience of description, the sentence SEq is described as the feature sentence (hereinafter referred to as the feature sentence SEq). The information processing apparatus calculates a sentence vector SVq of the feature sentence SEq by integrating words included in the feature sentence SEq based on the dictionary data.

The information processing apparatus compares the sentence vector SVq of the feature sentence SEq with the sentence vector of the y-axis of the inverted index Tse to specify a similar sentence vector. Among the sentence vectors of the y-axis of the inverted index Tse, a sentence vector similar to the sentence vector SVq of the feature sentence SEq is referred to as a "similar vector".

The information processing apparatus sequentially compares the sentence vector SVq of the feature sentence SEq with the respective sentence vectors of the y-axis of the inverted index Tse, specifies one similar vector, and then specifies another similar vector using the cluster number associated with the specified similar vector as a key.

For example, when the sentence vector SVq and the sentence vector SV1-2 are similar to each other, the sentence vector SV2-2, which is classified into the same cluster as the sentence vector SV1-2, is also specified as the similar vector. In the following description, the sentence vectors SV1-2 and SV2-2 are referred to as similar vectors SV1-2 and SV2-2, respectively. It is assumed that the offset of the similar vector SV1-2 is denoted as "OF1", and the offset of the similar vector SV2-2 is denoted as "OF2".

FIG. 3 will be described. The information processing apparatus generates an inverted index Tse-1 obtained by interchanging the relationship between the x-axis and the y-axis of the inverted index Tse. Sentence vectors are set on the x-axis (horizontal axis) of the inverted index Tse-1, and offsets are set on the y-axis (vertical axis). The information processing apparatus may also generate the inverted index Tse-1 at the time of generating the inverted index Tse.

The information processing apparatus calculates sentence vectors of a predetermined number of sentences before and after the feature sentence SEq included in the search query 10 as a reference, and arranges the calculated sentence vectors in the order of the sentences of the search query to generate query transition data 11. The horizontal axis of the query transition data 11 corresponds to the order of the sentences of the search query 10, and the vertical axis corresponds to the magnitude of the sentence vector.

For example, in the query transition data 11, the sentence vector SV10−1 of the (M−1)th sentence, the vector SV10 of the Mth feature sentence, and the sentence vector SV10+1 of the (M+1)th sentence of the search query 10 are arranged.

The information processing apparatus generates the transition data 12*a* by extracting, from the inverted index Tse-1, sentence vectors of offsets within a predetermined range before and after the position "OF1" of the similar vector SV1-2.

For example, in the transition data 12*a*, a sentence vector SV1-α corresponding to the offset OF1−1 of the inverted index Tse-1, a sentence vector SV1-2 of the offset OF1, and a sentence vector SV1-β of the offset OF1+1 are arranged.

Further, the information processing apparatus generates the transition data 12*b* by extracting, from the inverted index Tse-1, sentence vectors of offsets within a predetermined range before and after the position "OF2" of the similar vector SV2-2. The horizontal axis of the transition data 12*a* and 12*b* corresponds to the offset, and the vertical axis corresponds to the magnitude of the sentence vector.

For example, in the transition data 12*b*, a sentence vector SV2-α corresponding to the offset OF2−1 of the inverted index Tse-1, a sentence vector SV2-2 of the offset OF1, and a sentence vector SV2-β of the offset OF2+1 are arranged.

The information processing apparatus calculates the degree of similarity between the query transition data 11 and the transition data 12*a*, and the degree of similarity between the query transition data 11 and the transition data 12*b*, respectively. Here, a case where the degree of similarity between the query transition data 11 and the transition data 12*a* is equal to or greater than the predetermined value and the degree of similarity between the query transition data 11 and the transition data 12*b* is less than the predetermined value will be described.

The information processing apparatus specifies the offset of the sentence of the similar vector SV1-2 corresponding to the transition data 12*b* based on the inverted index Tse, and extracts the paragraph including the sentence at the specified position as the search result of the search query 10.

As described above, the information processing apparatus according to the present embodiment classifies similar sentence vectors into the same cluster and generates the inverted index Tse in which the sentence vector (cluster number) and the offset are associated with each other. When receiving the search query 10, the information processing apparatus specifies a plurality of similar vectors based on the feature sentence extracted from the search query 10, the vector of the inverted index Tse, and the cluster number.

The information processing apparatus compares query transition data indicating transition of sentence vectors of preceding and succeeding sentences including a feature sentence with transition data indicating transition of sentence vectors in a predetermined range with reference to an offset of a similar vector generated based on an inverted index Tse-1. The information processing apparatus extracts a paragraph of a search query on the basis of an offset of a similar vector of transition data whose similarity is equal to or greater than a threshold value.

As described above, the information processing apparatus classifies similar sentence vectors into the same cluster, thereby efficiently specifying a similar vector similar to a feature sentence. In addition, since the information processing apparatus narrows down the search target on the basis of the query transition data based on the search query and the transition data based on the similar vector and the inverted index Tse-1, it is possible to search for a paragraph more similar to the sentence of the search query.

Figure 4:
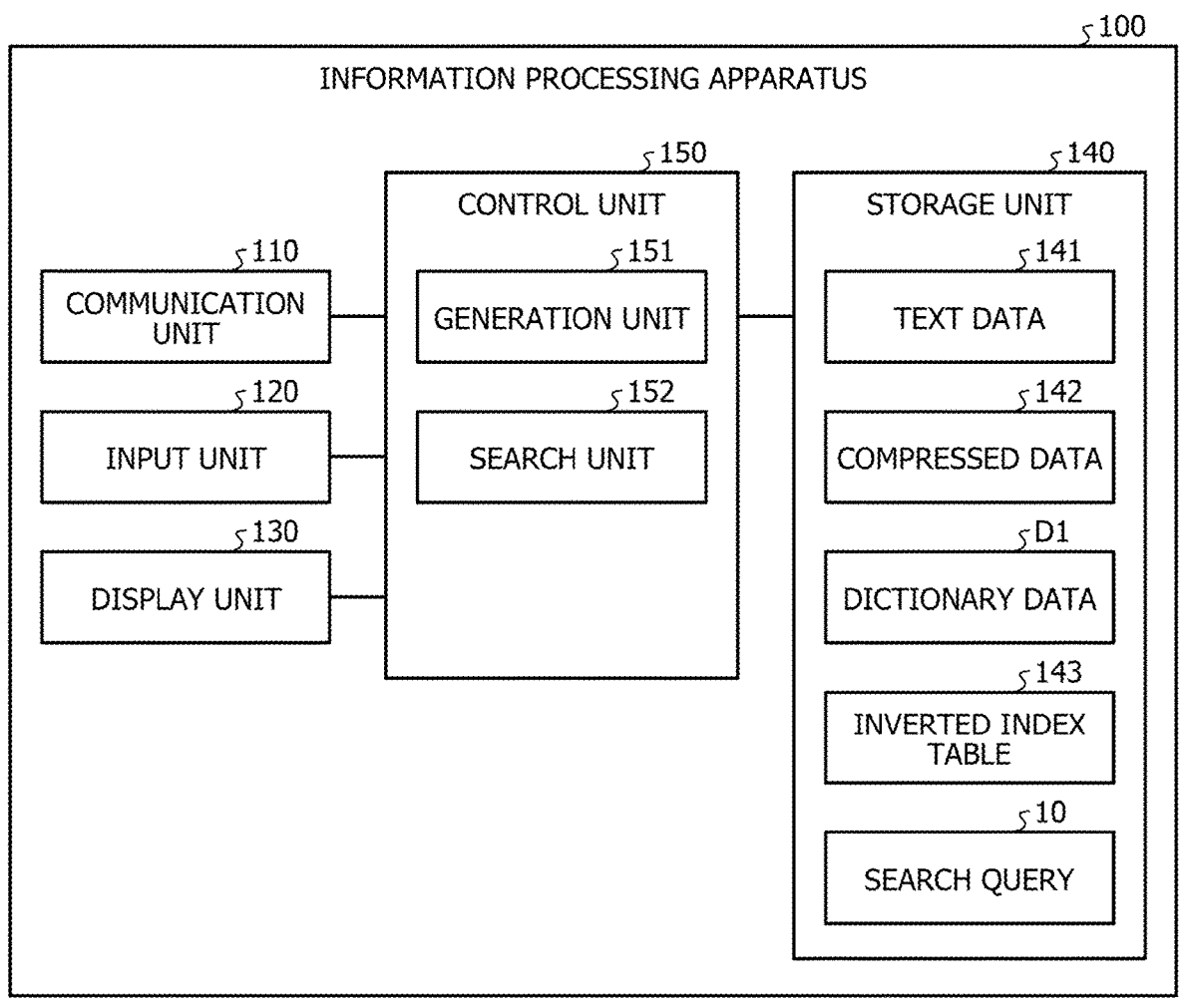
FIG. 4 is a functional block diagram illustrating a configuration of the information processing apparatus according to the present embodiment.

Next, a configuration of the information processing apparatus according to the present embodiment will be described. FIG. 4 is a functional block diagram illustrating a configuration of the information processing apparatus according to the present embodiment. As illustrated in FIG. 4, the information processing apparatus 100 includes a communication unit 110, an input unit 120, a display unit 130, a storage unit 140, and a control unit 150.

The communication unit 110 is coupled to an external device or the like in a wired or wireless manner, and transmits and receives information to and from the external device or the like. For example, the communication unit 110 is realized by a network interface card (NIC) or the like. The communication unit 110 may be connected to a network (not illustrated).

The input unit 120 is an input device that inputs various types of information to the information processing apparatus 100. The input unit 120 corresponds to a keyboard, a mouse, a touch panel, or the like. For example, the user may operate the input unit 120 to input a search query or the like.

The display unit 130 is a display device that displays information output from the control unit 150. The display unit 130 corresponds to a liquid crystal display, an organic electro luminescence (EL) display, a touch panel, or the like. For example, a search result corresponding to the search query is displayed on the display unit 130.

The storage unit 140 includes text data 141, compressed data 142, dictionary data D1, an inverted index table 143, and a search query 10. The storage unit 140 is realized by, for example, a semiconductor memory element such as a random access memory (RAM) or a flash memory, or a storage device such as a hard disk or an optical disk.

The text data 141 is text data having a plurality of paragraphs described with reference to FIG. 1. In the present embodiment, text data in Japanese is exemplified, but it is not limited to this. For example, the text data may be written in other languages, and may include source programs, genome sequences, chemical structure formulas of organic compounds, outline PostScript of images, or the like.

The compressed data 142 is data obtained by compressing the text data 141 on a word basis based on the dictionary data D1. Illustration of the compressed data 142 is omitted. In the compressed data 142, a code serving as a delimiter of a paragraph (a code of a line feed) or a code serving as a delimiter of a sentence (a code of a period) may be set.

The dictionary D1 is a dictionary that defines a relationship among a predetermined word, a static code, and a vector corresponding to the predetermined word. FIG. 5 is a diagram illustrating an example of a data structure of dictionary data. As illustrated in FIG. 5, in the dictionary D1, words, static codes, and vectors are associated with one another.

The inverted index table 143 includes inverted indices of a plurality of granularities. FIG. 6 is a diagram illustrating an example of a data structure of an inverted index table. As illustrated in FIG. 6, the inverted index table 143 includes an inverted index Two, an inverted index Tse, an inverted index Tpa, an inverted index Tse-1, and an inverted index Tpa-1.

Figure 7:
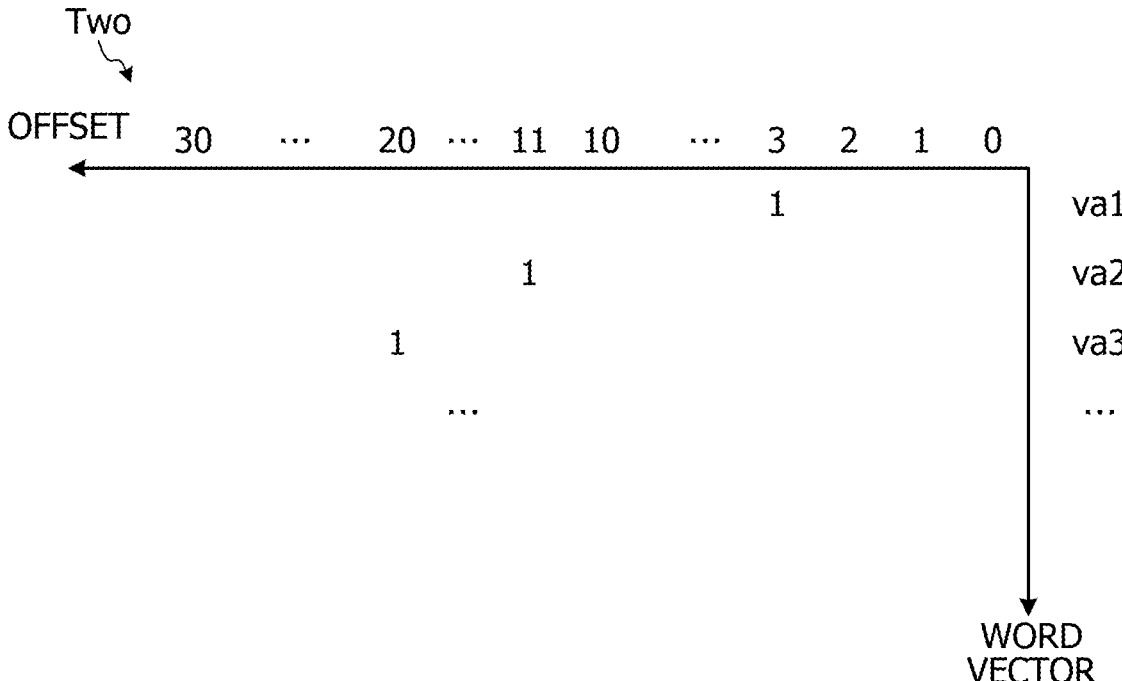
FIG. 7 is a diagram illustrating an example of an inverted index Two.

The inverted index Two is information defining a relationship between a vector of a word and an offset of the word. FIG. 7 is a diagram illustrating an example of the inverted index Two. In the inverted index Two, offsets are set on the x-axis, and vectors of words are set on the y-axis. The offset indicates a position from the head of a code (corresponding to a word) in the compressed data 142.

For example, the offset "0" corresponds to the position of the leading code of the compressed data 142. The offset "N" corresponds to the position of the "N+1"th code from the head of the compressed data 142.

In FIG. 7, the flag "1" is set at the intersection of the row of the word vector "va1" and the column of the offset "3". This indicates that the code of the word corresponding to the word vector "va1" is located at the offset "3" of the compressed data 142. It is assumed that all initial values of the inverted index Two are set to zero.

The inverted index Tse is information defining a relationship between a sentence vector and an offset of a sentence. The inverted index Tse corresponds to the inverted index Tse described in FIG. 2. In the inverted index Tse, offsets are set on the x-axis, and sentence vectors are set on the y-axis. The offset indicates a position from the head of the code in the compressed data 142. Although an offset is assigned at the granularity of a sentence, an offset at the granularity of a word (the position of the code of the word at the beginning of a sentence) may be used instead.

A "cluster number" for uniquely identifying a cluster classified by the clustering described with reference to FIG. 1 is assigned to a sentence vector set on the y-axis of the inverted index Tse.

Figure 8:
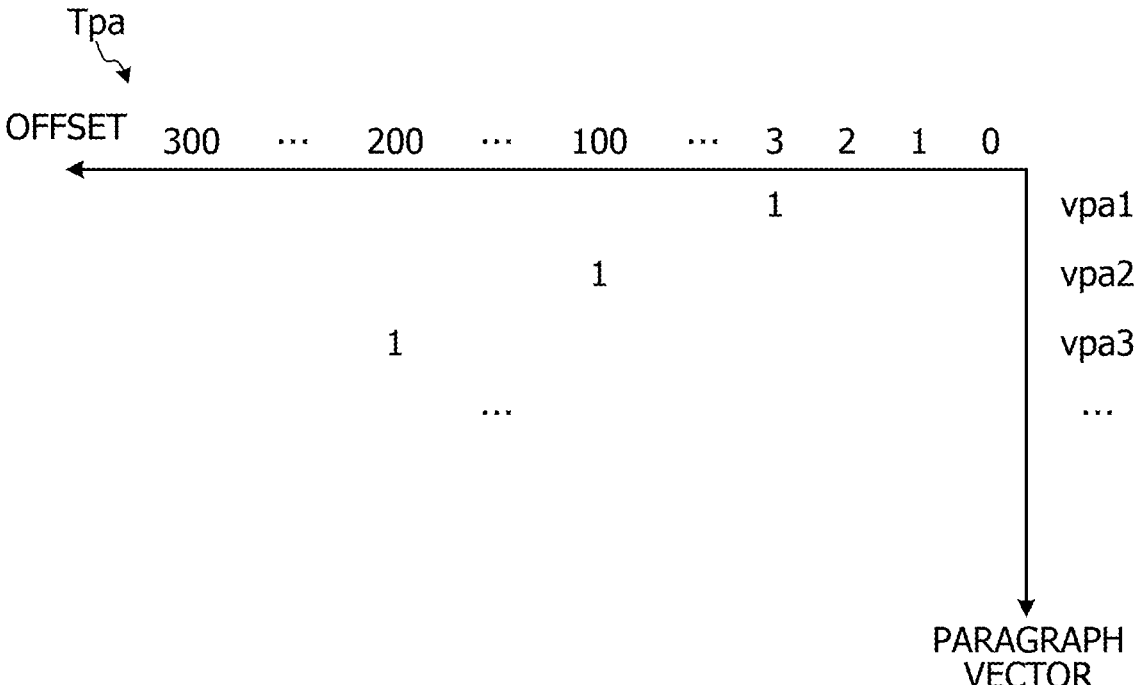
FIG. 8 is a diagram illustrating an example of the inverted index Tpa.

The inverted index Tpa is information that defines a relationship between a vector of a paragraph and an offset of a first word among a plurality of words included in a first sentence of the paragraph. FIG. 8 is a diagram illustrating an example of the inverted index Tpa. In the inverted index Tpa, offsets are set on the x-axis, and vectors of paragraphs are set on the y-axis. The vector of the paragraph is calculated by integrating sentence vectors included in the paragraph. The vector of the paragraph is denoted as a "paragraph vector". The offset indicates a position from the head of the code (the code of the first word among the plurality of words included in the first sentence of the paragraph) in the compressed data 142.

The inverted indexes Tse-1 and Tpa-1 are inverted indexes obtained by exchanging the correspondence between the x-axis and the y-axis of the inverted indexes Tse and Tpa. That is, in the inverted index Tse-1, the sentence vectors are set to the x-axis, the offsets are set to the y-axis, while in the inverted index Tpa-1, the paragraph vectors are set to the x-axis, and the offsets are set to the y-axis.

Refer back to FIG. 4. The control unit 150 includes a generation unit 151 and a search unit 152. The control unit 150 is realized by, for example, a central processing unit (CPU) or a micro processing unit (MPU). Further, the control unit 150 may be implemented by an integrated circuit such as an application specific integrated circuit (ASIC) or a field programmable gate array (FPGA).

The generation unit 151 is a processing unit that generates the compressed data 142 and the inverted index table 143 based on the text data 141 and the dictionary data D1. For example, the generation unit 151 generates the inverted index Tse and the like by executing the processing described with reference to FIG. 1.

The generation unit 151 scans the text data 141 and specifies a plurality of paragraphs and a plurality of sentences included in each paragraph. For example, the generation unit 151 is a portion sandwiched between text line feeds. The generation unit 151 specifies a sentence included in a paragraph based on a period, a punctuation mark, or the like.

The generation unit 151 selects one paragraph of the text data 141 and selects one sentence from a plurality of sentences included in the selected paragraph. The generation unit 151 executes morphological analysis on the sentence and divides the sentence into a plurality of words. The generation unit 151 compares each word of the sentence with the dictionary data D1 and specifies a code and a vector corresponding to the word. The generation unit 151 compresses (encodes) the sentence by replacing the respective words included in the sentence with the corresponding code. The generation unit 151 calculates a sentence vector of the sentence by integrating vectors corresponding to respective words of the sentence.

By repeatedly executing the above-described processing on each sentence included in one paragraph, the generation unit 151 compresses the sentence and calculates a sentence vector of the sentence. The generation unit 151 calculates the vector of the paragraph by integrating the sentence vectors of the sentences included in the paragraph. The generation unit 151 repeatedly executes the above-described processing for each paragraph to generate the compressed data 142.

When the generation unit 151 compares the word of the sentence with the dictionary data D1 and assigns a vector to the word, the generation unit 140 sets the relationship between the vector of the word and the offset of the code of the word in the inverted index Two. When calculating the sentence vector of the sentence, the generation unit 151 specifies the offset of the code of the word at the head of the sentence and sets the relationship between the sentence vector and the offset in the inverted index Tse. When calculating the paragraph vector of the paragraph, the generation unit 151 specifies the offset of the code of the first word of the first sentence of the paragraph and sets the relationship between the paragraph vector and the offset in the inverted index Tpa.

In addition, the generation unit 151 performs clustering on the sentence vectors of the respective sentences and classifies the sentence vectors into a plurality of clusters. For example, the generation unit 151 performs clustering on the sentence vectors using a k-means method or the like. The generation unit 151 assigns the same cluster number to the sentence vectors classified into the same cluster based on the result of the clustering, and sets the cluster number to the sentence vector of the inverted index Tse.

For example, as described with reference to FIGS. 1 and 2, when the sentence vectors SV1-2 and SV2-2 are classified into the same cluster (the cluster having the cluster number "G11"), the generation unit 151 sets the cluster number "G11" to the sentence vectors SV1-2 and SV2-2 on the y-axis of the inverted index Tse.

The generation unit 151 generates an inverted index Tse-1 or Tpa-1 in which the relationship between the x-axis and the y-axis of the inverted index Tse or Tpa is switched, and stores the inverted index Tse-1 or Tpa-1 in the inverted index table 143.

The search unit 152 is a processing unit that, upon receiving a search query 10, performs a search for a paragraph similar to the search query 10. The search unit 152 specifies a feature sentence from a plurality of sentences included in the search query 10. For example, the search unit 152 holds list information of words having a low appearance frequency, and specifies, as a feature sentence, a sentence having a maximum content rate of words having a low appearance frequency among a plurality of sentences.

The search unit 152 performs morphological analysis on the feature sentence to divide the feature sentence into a plurality of words. The search unit 152 specifies a vector of a word included in the feature sentence based on the feature sentence and the dictionary D1, and calculate a vector of the feature sentence by integrating the vectors of the respective words included in the feature sentence. In the following description, a vector of a feature sentence is referred to as a "feature sentence vector".

The search unit 152 compares the feature sentence vector with the y-axis sentence vector of the inverted index Tse to specify a similar sentence vector (similar vector). The search unit 152 calculates a cosine similarity between the feature sentence vector and the sentence vector, and specifies, as a similar vector, a sentence vector whose cosine similarity is equal to or greater than a threshold.

When the first similar vector is specified, the search unit 152 specifies another similar vector using as a key the cluster number associated with the similar vector. For example, as described in FIG. 3, when the sentence vector (feature sentence vector) SVq and the sentence vector SV1-2 are similar to each other, the sentence vector SV2-2 classified into the same cluster as the sentence vector SV1-2 is also specified as a similar vector.

When the similar vector is specified, the search unit 152 executes the following processing. As described in FIG. 3, the search unit 152 calculates sentence vectors of a predetermined number of sentences before and after the feature sentence SEq included in the search query 10 as a reference and arranges the calculated sentence vectors in the order of the sentences to generate the query transition data 11. The process of calculating a sentence vector of a sentence by the search unit 152 is the same as the process of calculating a feature sentence vector from a feature sentence.

As described with reference to FIG. 3, the search unit 152 generate a transition data 12a by extracting, from the inverted index Tse-1, a sentence vector having an offset within a predetermined range before and after the position (offset) "OF1" of the similar vector SV1-2. The search unit 152 generates the transition data 12b by extracting, from the inverted index Tse-1, a sentence vector having an offset within a predetermined range before and after the position "OF2" of the similar vector SV2-2.

The search unit 152 calculates the degree of similarity between the query transition data 11 and the transition data 12a and the degree of similarity between the query transition data 11 and the transition data 12b, respectively. Here, a case where the degree of similarity between the query transition data 11 and the transition data 12a is equal to or greater than the predetermined value and the degree of similarity between the query transition data 11 and the transition data 12b is less than the predetermined value will be described.

Based on the offset (OF1) of the sentence of the similar vector SV1-2 corresponding to the transition data 12a, and the inverted index Tpa, the search unit 152 specifies the offset of the paragraph including the sentence of the similar vector SV1-2. For example, the search unit 152 specifies, as the offset of the paragraph including the sentence of the similar vector SV1-2, an offset of a paragraph in which the flag set to "1" is first found in the inverted index Tpa of the paragraph when going forward with reference to the same offset as the offset of the sentence.

Figure 9:
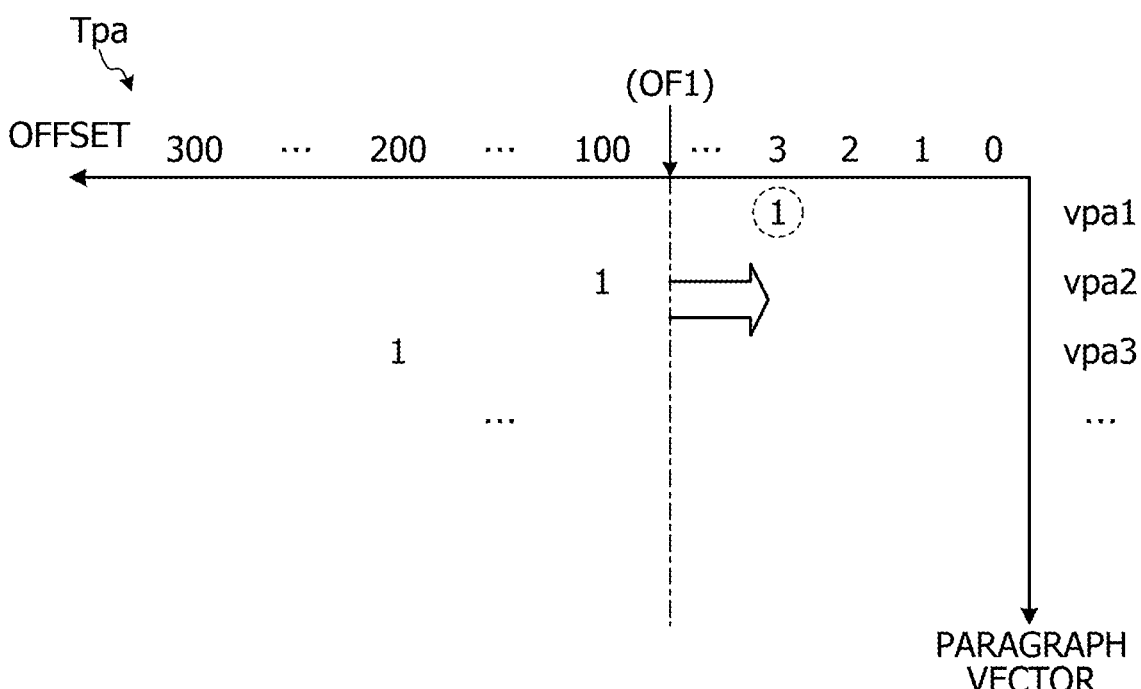
FIG. 9 is a diagram for explaining processing of a search unit according to the present embodiment.

FIG. 9 is a diagram for explaining processing of a search unit according to the present embodiment. In FIG. 9, the offset (OF1) of the sentence of the similar vector SV1-2 is used for description. In the example illustrated in FIG. 9, the offset "3" corresponding to the paragraph vector "vpa1" is an example of an offset of a paragraph in which the flag set to "1" is first found in the inverted index Tpa when going forward with reference to the offset OF1 same as the offset of the sentence.

Based on the offset of the specified paragraph, the search unit 152 acquires information on the compressed paragraph (the code of each word included in the paragraph) from the compressed data 142. The search unit 152 generates data of the paragraph by decoding the code of each word included in the paragraph on the basis of the dictionary D1. The search unit 152 outputs the data of the decrypted paragraph to the display unit 130 as a search result.

The search unit 152 may further use the vector of the paragraph described with reference to FIG. 9 to narrow down the search target paragraphs. For example, it is assumed that the query transition data 11 is compared with a plurality of pieces of transition data and there are a plurality of pieces of transition data having a similarity equal to or greater than a threshold. Here, transition data whose degree of similarity to the query transition data 11 is equal to or greater than a threshold value is set as first candidate transition data and second candidate transition data.

The search unit 152 acquires, based on an offset of a similar vector corresponding to the first candidate transition data and the inverted index Tpa, a paragraph vector (first paragraph vector) of a paragraph including a sentence of the similar vector corresponding to the first candidate transition data. The search unit 152 acquires, based on an offset of a similar vector corresponding to the second candidate transition data and the inverted index Tpa, a paragraph vector (second paragraph vector) of a paragraph including a sentence of the similar vector corresponding to the second candidate transition data.

The search unit 152 calculates a first similarity between the vector of the search query 10 and the first paragraph vector, and a second similarity between the vector of the search query 10 and the second paragraph vector, respectively. The vector of the search query 10 is a vector obtained by integrating sentence vectors included in the search query 10. The search unit 152 may output, as a search result, data of a paragraph corresponding to a paragraph vector having a larger one of the first similarity and the second similarity. When both the first similarity and the second similarity are equal to or greater than the threshold value, data of paragraphs corresponding to both paragraph vectors may be output as a search result.

Next, an example of a processing procedure of the information processing apparatus 100 according to the present embodiment will be described. FIG. 10 is a flowchart (1) illustrating a processing procedure of the information processing apparatus according to the present embodiment. As illustrated in FIG. 10, the generation unit 151 of the information processing apparatus 100 scans the text data 141 and specifies a plurality of paragraphs and a plurality of sentences included in each paragraph (step S101).

The generation unit 151 selects one paragraph of the text data 141 (step S102). For each of the plurality of sentences included in the selected paragraph, the generation unit 151 calculates a sentence vector based on the dictionary data D1 and encodes words of the sentence (step S103).

The generation unit 151 calculates the paragraph vector by integrating the sentence vectors of the sentences included in the paragraph (step S104). The generation unit 151 registers the encoded paragraph in the compressed data (step S105).

The generation unit 151 updates the inverted indexes Two, Tse, and Tpa (step S106). The generation unit 151 determines whether or not all the paragraphs of the text data 141 have been selected (step S107). When all the paragraphs of the text data 141 have not been selected (No at Step S107), the generation unit 151 proceeds to Step S102.

When all the paragraphs of the text data 141 have been selected (Yes at Step S107), the generation unit 151 generates inverted indexes Tse-1 and Tpa-1 by exchanging the correspondence between the x-axis and the y-axis of the inverted indexes Tse and Tpa, respectively, and compresses them by hashing in the vertical direction (Step S108). An example of the compression processing will be described later.

FIG. 11 is a flowchart (2) illustrating the processing procedure of the information processing apparatus according to the present embodiment. As illustrated in FIG. 11, the search unit 152 of the information processing apparatus 100 receives a search query 10 (step S201). The search unit 152 specifies a feature sentence from a plurality of sentences included in the search query 10 (step S202).

The search unit 152 calculates a feature sentence vector of the feature sentence using the dictionary data D1 (step S203). The search unit 152 specifies a similar vector based on the feature sentence vector, the sentence vector of the inverted index Tse, and the cluster number (step S204).

The search unit 152 generates a query transition data based on sentence vectors of sentences at positions before and after the feature sentence in the search query (step S205). The search unit 152 generates, based on the inverted index Tse-1, a transition data in which sentence vectors of offsets before and after the offset of the similar vector are arranged (step S206).

The search unit 152 calculates the degree of similarity between the query transition data and each transition data, and specifies the transition data whose degree of similarity is equal to or greater than a predetermined value (step S207). The search unit 152 specifies an offset of a paragraph having a sentence corresponding to the transition data whose similarity is equal to or greater than a predetermined value (step S208). Note that the paragraph vector may be acquired based on the offset of the similar sentence vector and the inverted index Tpa-1 to improve the accuracy of the similarity evaluation.

The search unit 152 acquires the encoded paragraph from the compressed data 142 based on the identified offset (step S209). The search unit 152 decodes the encoded paragraph based on the dictionary data D1 (step S210). The search unit 152 outputs the information of the decrypted paragraph as a search result (step S211).

Next, advantageous effects of the information processing apparatus 100 according to the present embodiment will be described. The information processing apparatus 100 classifies similar sentence vectors into the same cluster and generates an inverted index Tse in which a sentence vector (cluster number) and an offset are associated with each other. When receiving the search query 10, the information processing apparatus 100 specifies a plurality of similar vectors based on the feature sentence extracted from the search query 10, the vector of the inverted index Tse, and the cluster number. In this way, by classifying similar sentence vectors into the same cluster, it is possible to efficiently specify a similar vector similar to a feature sentence.

The information processing apparatus 100 acquires the sentence vectors of the sentences before and after the candidate similar to the feature sentence based on the transition data of the search query indicating the transition of the sentence vectors of the sentences before and after the feature sentence and the inverted index Tse-1, and generates the transition data of the similar candidate in which the transitions of the sentence vectors are collected. The transition of the sentence vector of each transition data of the similar candidate is compared with the transition data of the search query as a reference, and similarity evaluation is performed. The information processing apparatus 100 extracts the information of the paragraph of the search query based on the offset of the similar vector of the transition data in which the similarity is equal to or greater than the threshold value. In this way, since the search target is narrowed down based on the transition data, it is possible to efficiently search for a paragraph more similar to the sentence of the search query with high accuracy. Furthermore, the search query and the search target may include not only text composed of a plurality of sentences but also a source program, a base sequence of a genome, a chemical structural formula of an organic compound, an outline of an image, PostScript, and the like.

Although the generation unit 151 of the information processing apparatus 100 generates the inverted index Two, the inverted index Tse, the inverted index Tpa, and the inverted index Tse-1, the size may be reduced by performing the following hashing process. In the following description, an index having an offset on the horizontal axis and a vector on the vertical axis, such as the inverted index Two, the inverted index Tse, and the inverted index Tpa, is referred to as a "first index". An index having a vector on the horizontal axis and an offset on the vertical axis, such as the inverted index Tse-1, is referred to as a "second index".

Figure 12A:
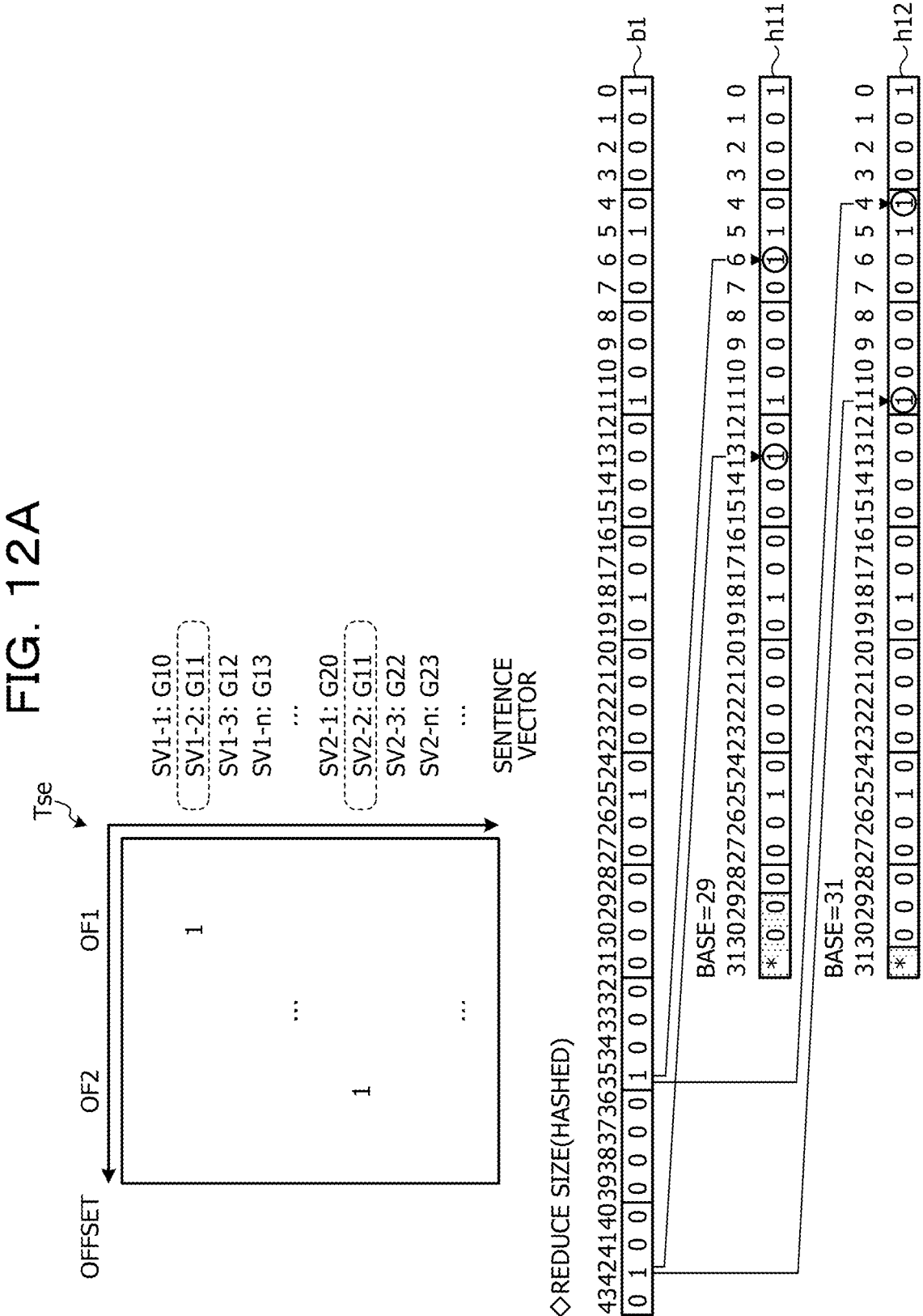
FIG. 12A is a diagram for explaining an example of processing for hashing the first index.

FIG. 12A is a diagram illustrating an example of a process of hashing a first index. Here, a 32-bit register is assumed, and each bitmap of the first index 140c is hashed based on prime numbers (base numbers) of 29 and 31 as an example. A case where a hashed bitmap h11 and a hashed bitmap h12 are generated from a bitmap b1 will be described. The bitmap b1 indicates a bitmap obtained by extracting a certain row of the first index 140c. Hashed bitmap h11 is a bitmap hashed by base "29". Hashed bitmap h12 is a bitmap hashed by base "31".

The generation unit 151 obtains the value of the remainder obtained by dividing the position of each bit of the bitmap b1 by a base, and associates the value of the remainder with the position of the hashed bitmap. When "1" is set at the bit position of the corresponding bitmap b1, the generation unit 151 performs a process of setting "1" at the position of the associated hashed bitmap.

An example of processing for generating a hashed bitmap h11 with a base of "29" from a bitmap b1 will be described. First, the generation unit 151 copies the information of the positions "0 to 28" of the bitmap b1 to the hashed bitmap h11. Subsequently, since the remainder obtained by dividing the bit position "35" of the bitmap b1 by the base "29" is "6", the position "35" of the bitmap b1 is associated with the position "6" of the hashed bitmap h11. Since "1" is set to the position "35" of the bitmap b1, the generation unit 151 sets "1" to the position "6" of the hashed bitmap h11.

Since the remainder obtained by dividing the bit position "42" of the bitmap b1 by the base "29" is "13", the position "42" of the bitmap b1 is associated with the position "13" of the hashed bitmap h11. Since "1" is set at the position "42" of the bitmap b1, the generation unit 151 sets "1" at the position "13" of the hashed bitmap h11.

The generation unit 151 generates the hashed bitmap b1 by repeatedly executing the above-described processing for positions equal to or greater than the position "29" of the bitmap h11.

An example of processing for generating a hashed bitmap b1 with a base "31" from a bitmap h12 will be described.

First, the generation unit 151 copies the information of the position "0 to 30" of the bitmap b1 to the hashed bitmap h12. Subsequently, since the remainder obtained by dividing the bit position "35" of the bitmap b1 by the base "31" is "4", the position "35" of the bitmap b1 is associated with the position "4" of the hashed bitmap h12. Since "1" is set to the position "35" of the bitmap b1, the generation unit 151 sets "1" to the position "4" of the hashed bitmap h12.

Since the remainder obtained by dividing the bit position "42" of the bitmap b1 by the base "31" is "11", the position "42" of the bitmap b1 is associated with the position "11" of the hashed bitmap h12. Since "1" is set at the position "42" of the bitmap b1, the generation unit 151 sets "1" at the position "13" of the hashed bitmap h12.

The generation unit 151 generates the hashed bitmap h12 by repeatedly executing the above-described processing for positions equal to or greater than the position "31" of the bitmap b1.

The generation unit 151 can reduce the amount of the first index 140c by compressing each row of the first index 140c by the above-described folding technique. It is assumed that the hashed bitmaps with the bases "29" and "31" are added with information on the row (vector) of the bitmap of the generation source and stored in the storage unit 140.

Figure 12B:
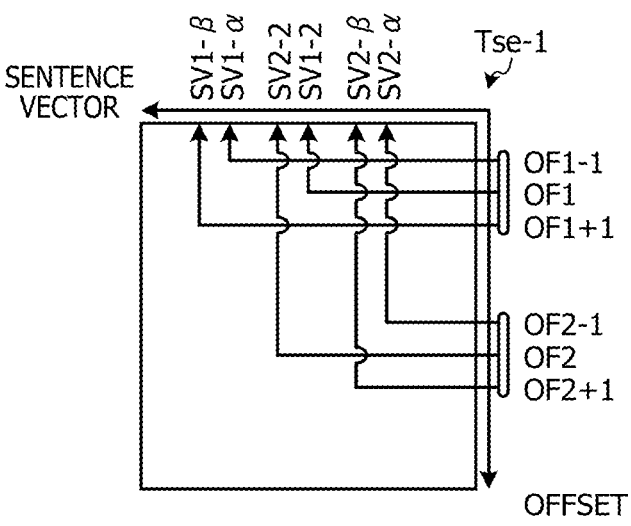
FIG. 12B is a diagram for explaining an example of processing for hashing a second index.

When the second index 140d is generated, the generation unit 151 may reduce the size of the second index 140d by hashing the second index 140d with an adjacent prime number (base) using a bitmap folding technique. FIG. 12B is a diagram illustrating an example of a process of hashing a second index.

Here, as an example, each bitmap of the second index 140d is hashed based on prime numbers (bases) of 11 and 13. A case where a hashed bitmap h21 and a hashed bitmap h22 are generated from a bitmap b2 will be described. It is assumed that the bitmap b2 is a bitmap obtained by extracting a certain row of the second index 140d, the hashed bitmap h21 is a bitmap hashed by the base "11", and the hashed bitmap h22 is a bitmap hashed by the base "13".

The generation unit 151 associates the value of the remainder obtained by dividing the position of each bit of the bitmap b2 by one base with the position of the hashed bitmap. When "1" is set at the bit position of the corresponding bitmap b2, the generation unit 151 performs a process of setting "1" at the position of the associated hashed bitmap.

An example of processing for generating the hashed bitmap h21 with the base "11" from the bitmap b2 will be described. First, the generation unit 151 copies information of the positions "0 to 10" of the bitmap b2 to the hashed bitmap h21. Subsequently, since the remainder obtained by dividing the bit position "15" of the bitmap b2 by the base "11" is "4", the position "15" of the bitmap b2 is associated with the position "4" of the hashed bitmap h11. Since "1" is set at the position "15" of the bitmap b2, the generation unit 151 sets "1" at the position "6" of the hashed bitmap h21.

The generation unit 151 generates the hashed bitmap h21 by repeatedly executing the above-described processing for positions equal to or greater than the position "15" of the bitmap b2.

An example of processing for generating the hashed bitmap h22 with the base of "13" from the bitmap b2 will be described. First, the generation unit 151 copies the information of the positions "0 to 12" of the bitmap b2 to the hashed bitmap h22. Subsequently, since the remainder obtained by dividing the bit position "15" of the bitmap b2 by the base "13" is "2", the position "15" of the bitmap b2 is associated with the position "2" of the hashed bitmap h22. Since "1" is set at the position "15" of the bitmap b2, the generation unit 151 sets "1" at the position "2" of the hashed bitmap h22.

The generation unit 151 generates the hashed bitmap h22 by repeatedly executing the above-described processing for positions equal to or greater than the position "15" of the bitmap b2.

The generation unit 151 can reduce the amount of the second index 140d by compressing each row of the second index 140d using the above-described folding technique. It is assumed that the hashed bitmaps with the bases "11" and "13" are added with information on the row (offset) of the bitmap of the generation source and stored in the storage unit 140.

When the first index 140c is hashed by the folding technique, the search unit 152 reads and restores the hashed bitmap corresponding to the vector, and then performs a process of specifying the offset of the vector.

Figure 13A:
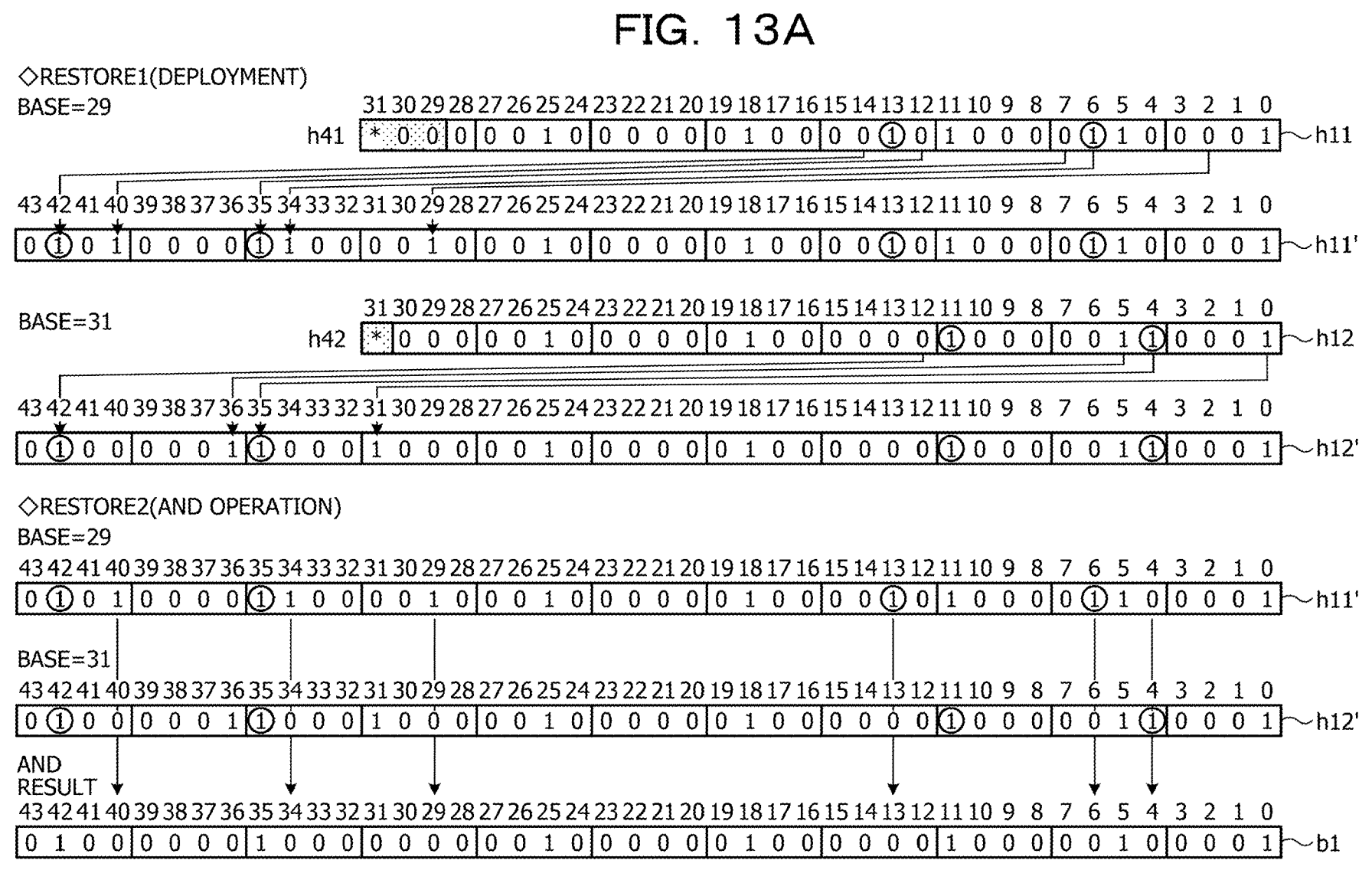

FIG. 13A is a diagram for explaining an example of a process of restoring the first index. Here, as an example, a case where the search unit 152 restores the bitmap b1 based on the hashed bitmap h11 and the hashed bitmap h12 will be described.

The search unit 152 generates an intermediate bitmap h11' from the hashed bitmap h11 with the base "29". The search unit 152 copies the values at positions 0 to 28 of the hashed bitmap h11 to positions 0 to 28 of the intermediate bitmap h11', respectively.

The search unit 152 repeatedly executes a process of copying, for every "29" values of the values after the position 29 of the intermediate bitmap h11', the values of the positions 0 to 28 of the hashed bitmap h11, respectively. In the example illustrated in the drawing 13A, it is exemplified that values of positions 0 to 14 of the hashed bitmap h11 are copied to positions 29 to 43 of the intermediate bitmap h11'.

The search unit 152 generates an intermediate bitmap h12' from the hashed bitmap h12 with the base "31". The search unit 152 copies the values at positions 0 to 30 of the hashed bitmap h12 to positions 0 to 30 of the intermediate bitmap h12', respectively.

The search unit 152 repeatedly executes a process of copying, for every "31" values of the values after the position 31 of the intermediate bitmap h12', the values of the positions 0 to 30 of the hashed bitmap h12, respectively. In the example illustrated in 13A of the drawing, it is exemplified that values of positions 0 to 12 of the hashed bitmap h12 are copied to positions 31 to 43 of the intermediate bitmap h12'.

After generating the intermediate bitmap h11' and the intermediate bitmap h12', the search unit 152 restores the bitmap b1 before hashing by performing an AND operation on the intermediate bitmap h11' and the intermediate bitmap h12'. The search unit 152 can restore the bitmap corresponding to the vector by repeatedly executing the same processing for the other hashed bitmaps.

When the second index 140d is hashed by the folding technique, the search unit 152 reads and restores the hashed bitmap corresponding to the offset, and then performs a process of specifying the attribute corresponding to the offset.

Figure 13B:
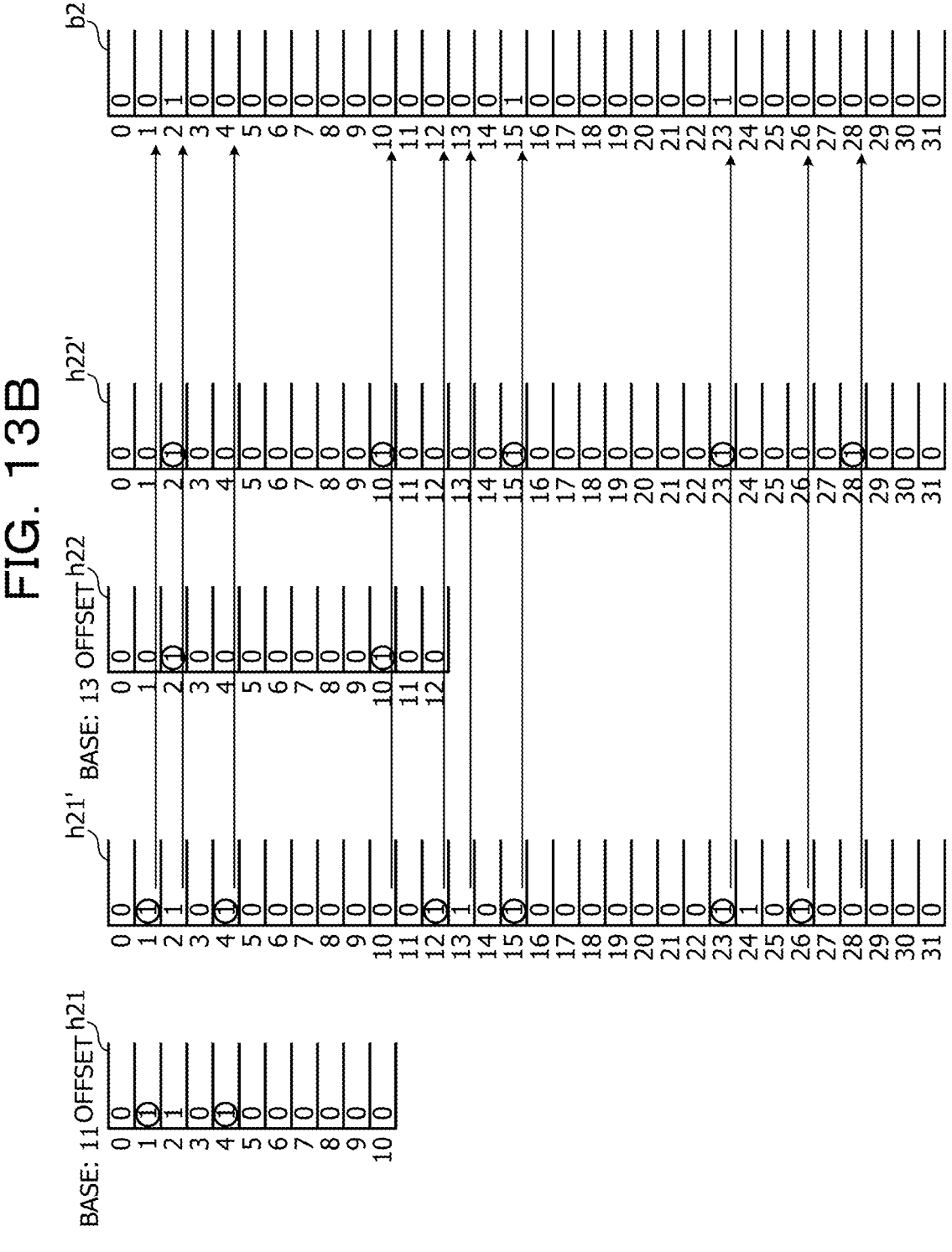
FIG. 13B is a diagram for explaining an example of a process of restoring the second index.

FIG. 13B is a diagram for explaining an example of a process of restoring a second index. Here, as an example, a case where the search unit 152 restores the bitmap b2 based on the hashed bitmap h21 and the hashed bitmap h22 will be described.

The search unit 152 generates an intermediate bitmap h21' from the hashed bitmap h21 with the base "11". The search unit 152 copies the values at positions 0 to 10 of the hashed bitmap h21 to positions 0 to 10 of the intermediate bitmap h21', respectively.

The search unit 152 repeatedly executes a process of copying, for every "11" values of the values at the position 11 and subsequent positions of the intermediate bitmap h21', the values at the positions 0 to 10 of the hashed bitmap h21, respectively. In the example illustrated in FIG. 13B, it is exemplified that values at positions 0 to 10 of the hashed bitmap h21 are copied to positions 11 to 21 of the interme-diate bitmap h21', and values at positions 0 to 9 of the hashed bitmap h21 are copied to positions 22 to 31 of the interme-diate bitmap h21'.

The search unit 152 generates an intermediate bitmap h22' from the hashed bitmap h22 with the base "13". The search unit 152 copies the values at positions 0 to 12 of the hashed bitmap h22 to positions 0 to 12 of the intermediate bitmap h22', respectively.

The search unit 152 repeatedly executes a process of copying, for every "13" values of the values of the position 13 and subsequent positions of the intermediate bitmap h22', the values of the positions 0 to 12 of the hashed bitmap h22, respectively. In the example illustrated in FIG. 13B, it is exemplified that values of positions 0 to 12 of the hashed bitmap h22 are copied to positions 13 to 25 of the interme-diate bitmap h22', and values of positions 0 to 5 of the hashed bitmap h22 are copied to positions 26 to 31 of the intermediate bitmap h22'.

After generating the intermediate bitmap h21' and the intermediate bitmap h22', the search unit 152 restores the bitmap b2 before hashing by performing an AND operation on the intermediate bitmap h21' and the intermediate bitmap h22'. The search unit 152 can restore, for each of the other hashed bitmaps, the bitmap corresponding to the offset by repeatedly executing the same processing.

Figure 14:
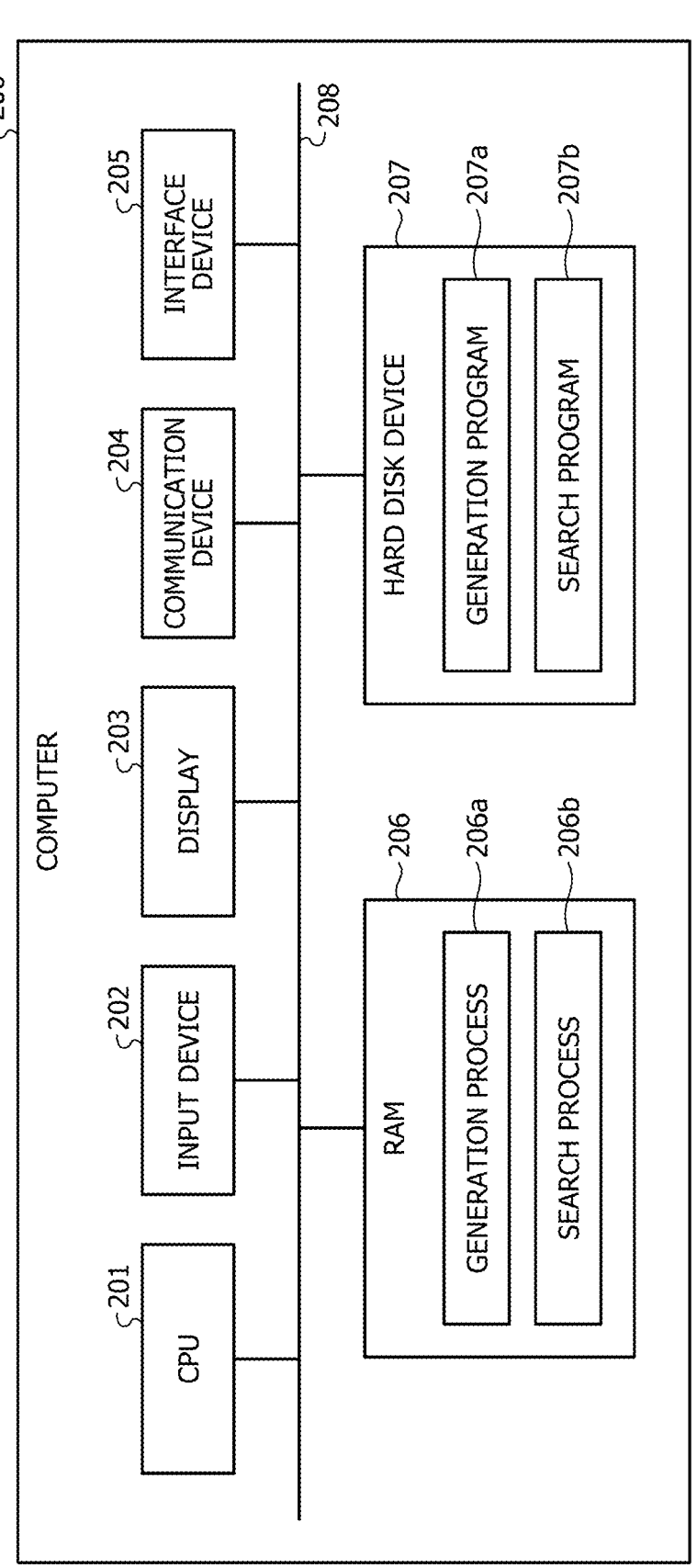
FIG. 14 is a diagram illustrating an example of a hardware configuration of a computer that realizes the same function as the information processing apparatus according to the embodiment.

Next, an example of a hardware configuration of a com-puter that realizes the same function as the information processing apparatus 100 described in the above-described embodiment will be described. FIG. 14 is a diagram illus-trating an example of a hardware configuration of a com-puter that realizes the same function as the information processing apparatus according to the embodiment.

As illustrated in FIG. 14, a computer 200 includes a CPU 201 configured to execute various types of arithmetic pro-cessing, an input device 202 configured to receive data entry from a user, and a display 203. In addition, the computer 200 includes a communication device 204 configured to exchange data with an external device or the like via a wired or wireless network, and an interface device 205. The computer 200 also includes a RAM 206 configured to temporarily store various types of information, and a hard disk device 207. The devices 201 to 207 are coupled to a bus 208.

The hard disk device 207 includes a generation program 207*a* and a search program 207*b*. The CPU 201 causes each of the programs 207*a* and 207*b* to be brought in the RAM 206.

The generation program 207*a* functions as a generation process 206*a*. The search program 207*b* functions as a search process 206*b*.

The processing of the generation process 206*a* corre-sponds to the processing of the generation unit 151. The processing of the search process 206*b* corresponds to the processing of the search unit 152.

The programs 207*a* and 207*b* are not necessarily stored in the hard disk device 207 from the beginning. For example, each program may be stored in a "portable physical medium" that is inserted into the computer 200, such as a flexible disk (FD), a CD-ROM, a DVD, a magneto-optical disk, or an IC card. Once inserted, the computer 200 may read and execute the programs 207*a* and 207*b*, respectively.

All examples and conditional language provided herein are intended for the pedagogical purposes of aiding the reader in understanding the invention and the concepts contributed by the inventor to further the art and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information processing program of a vector-based similarity search system for text data having a plurality of first sentences, the information processing program com-prising instructions for causing a computer to perform processing comprising:

classifying each vector of vectors of the plurality of first sentences stored in the text data into a corresponding group of a plurality of groups by performing clustering on the vectors of the plurality of first sentences, each group of the plurality of groups being a group to which vectors similar to each other belong among the plurality of vectors and to which a respective cluster identifier is assigned;

generating an inverted index including the vectors of the plurality of first sentences, the inverted index being information in which a vector of each first sentence of the plurality of first sentences, a position of the each first sentence on the text data, and a cluster identifier indicating the corresponding group assigned by the classifying are associated with each other;

identifying, when a search query including a plurality of second sentences is received, a feature sentence from the plurality of second sentences included in the search query;

specifying, from among the vectors of the plurality of first sentences, a similar vector being a vector similar to a vector of the feature sentence;

obtaining a plurality of similar vectors by specifying, from among the vectors of the plurality of first sen-tences, one or more similar vectors based on the similar vector and the inverted index, each of the one or more vectors being a vector associated in the inverted index with a same cluster identifier as the similar vector, the plurality of similar vectors including the one or more similar vectors and the similar vector;

specifying, for each similar vector of the plurality of similar vectors, first transition data indicating transition of vectors at positions before and after the similar vector based on the similar vector and the inverted index; and specifying, from among a plurality of pieces of first transition data obtained by performing the specifying of the first transition data on the plurality of similar vectors, transition data similar to second transition data, to output the transition data as a response of the search query, the second transition data being data indicating transition of vectors of sentences before and after the feature sentence in the search query.

2. The non-transitory computer-readable storage medium according to claim 1, the processing further comprising:

specifying a position of the data corresponding to the search query based on the similar vector corresponding to the first transition data specified by the specifying and the inverted index, and searching for data at the specified position.

3. The non-transitory computer-readable storage medium according to claim 1, wherein in the inverted index, a vector of a sentence is set on a first axis in a horizontal direction and a position is set on a second axis in a vertical direction, and the generating further includes updating the inverted index based on a relationship between the first axis and the second axis.

4. The non-transitory computer-readable storage medium according to claim 3, the processing further comprising: compressing the data of the inverted index in a vertical direction.

5. The non-transitory computer-readable storage medium according to claim 1, wherein the searching further includes specifying a position of the data corresponding to the search query by using a similarity between a vector of the search query and a vector of a paragraph including a sentence of the similar vector.

6. An information processing method implemented by a computer of a vector-based similarity search system for text data having a plurality of first sentences, the method comprising:

classifying each vector of vectors of the plurality of first sentences stored in the text data into a corresponding group of a plurality of groups by performing clustering on the vectors of the plurality of first sentences, each group of the plurality of groups being a group to which vectors similar to each other belong among the plurality of vectors and to which a respective cluster identifier is assigned;

generating an inverted index including the vectors of the plurality of first sentences, the inverted index being information in which a vector of each first sentence of the plurality of first sentences, a position of the each first sentence on the text data, and a cluster identifier indicating the corresponding group assigned by the classifying are associated with each other;

identifying, when a search query including a plurality of second sentences is received, a feature sentence from the plurality of second sentences included in the search query;

specifying, from among the vectors of the plurality of first sentences, a similar vector being a vector similar to a vector of the feature sentence;

obtaining a plurality of similar vectors by specifying, from among the vectors of the plurality of first sentences, one or more similar vectors based on the similar vector and the inverted index, each of the one or more vectors being a vector associated in the inverted index with a same cluster identifier as the similar vector, the plurality of similar vectors including the one or more similar vectors and the similar vector;

specifying, for each similar vector of the plurality of similar vectors, first transition data indicating transition of vectors at positions before and after the similar vector based on the similar vector and the inverted index; and specifying, from among a plurality of pieces of first transition data obtained by performing the specifying of the first transition data on the plurality of similar vectors, transition data similar to second transition data, to output the transition data as a response of the search query, the second transition data being data indicating transition of vectors of sentences before and after the feature sentence in the search query.

7. The information processing method according to claim 6, the method further comprising:

specifying a position of the data corresponding to the search query based on the similar vector corresponding to the first transition data specified by the specifying and the inverted index, and searching for data at the specified position.

8. The information processing method according to claim 6, wherein, in the inverted index, a vector of a sentence is set on a first axis in a horizontal direction and a position is set on a second axis in a vertical direction, and the generating further includes updating the inverted index based on a relationship between the first axis and the second axis.

9. The information processing method according to claim 8, the method further comprising compressing the data of the inverted index in a vertical direction.

10. The information processing method according to claim 6, wherein the searching includes specifying a position of the data corresponding to the search query by using a similarity between a vector of the search query and a vector of a paragraph including a sentence of the similar vector.

11. An information processing apparatus of a vector-based similarity search system for text data having a plurality of first sentences, the information processing apparatus comprising:

a memory; and a processor coupled to the memory, the processor being configured to perform processing including:

classifying each vector of vectors of the plurality of first sentences stored in the text data into a corresponding group of a plurality of groups by performing clustering on the vectors of the plurality of first sentences, each group of the plurality of groups being a group to which vectors similar to each other belong among the plurality of vectors and to which a respective cluster identifier is assigned;

generating an inverted index including the vectors of the plurality of first sentences, the inverted index being information in which a vector of each first sentence of the plurality of first sentences, a position of the each first sentence on the text data, and a cluster identifier indicating the corresponding group assigned by the classifying are associated with each other;

identifying, when a search query including a plurality of second sentences is received, a feature sentence from the plurality of second sentences included in the search query;

specifying, from among the vectors of the plurality of first sentences, a similar vector being a vector similar to a vector of the feature sentence;

obtaining a plurality of similar vectors by specifying, from among the vectors of the plurality of first sentences, one or more similar vectors based on the similar vector and the inverted index, each of the one or more vectors being a vector associated in the inverted index with a same cluster identifier as the similar vector, the plurality of similar vectors including the one or more similar vectors and the similar vector;

specifying, for each similar vector of the plurality of similar vectors, first transition data indicating transition of vectors at positions before and after the similar vector based on the similar vector and the inverted index; and specifying, from among a plurality of pieces of first transition data obtained by performing the specifying of the first transition data on the plurality of similar vectors, transition data similar to second transition data, to output the transition data as a response of the search query, the second transition data being data indicating transition of vectors of sentences before and after the feature sentence in the search query.

12. The information processing apparatus according to claim 11, the processing further comprising:

specifying a position of the data corresponding to the search query based on the similar vector corresponding to the first transition data specified by the specifying and the inverted index, and searching for data at the specified position.

13. The information processing apparatus according to claim 11, wherein in the inverted index, a vector of a sentence is set on a first axis in a horizontal direction and a position is set on a second axis in a vertical direction, and the generating further includes updating the inverted index based on a relationship between the first axis and the second axis.

14. The information processing apparatus according to claim 13, wherein the processing further comprising: compressing the data of the inverted index in a vertical direction.

15. The information processing apparatus according to claim 11, wherein the searching further includes specifying a position of the data corresponding to the search query by using a similarity between a vector of the search query and a vector of a paragraph including a sentence of the similar vector.

* * * * *